United States Patent [19]

Katoh

[11] Patent Number: 4,674,624

[45] Date of Patent: Jun. 23, 1987

[54] FEED BAR OPERATING DEVICE FOR A TRANSFER PRESS

[75] Inventor: Taro Katoh, Hatano, Japan

[73] Assignee: Amada Company, Limited, Japan

[21] Appl. No.: 817,725

[22] Filed: Jan. 10, 1986

[30] Foreign Application Priority Data

Jan. 12, 1985 [JP] Japan .................................. 60-1799[U]

[51] Int. Cl.⁴ ............................................ B65G 25/04
[52] U.S. Cl. ................................................. 198/621
[58] Field of Search ...................... 198/621, 774–776;
74/569; 414/750, 751; 139/79

[56] References Cited

U.S. PATENT DOCUMENTS

| 2,592,820 | 4/1952 | Moessinger | 139/79 X |
| 2,656,729 | 10/1953 | Bellini | 74/569 X |
| 3,503,491 | 3/1970 | Taniguchi | 198/621 |
| 3,991,793 | 11/1976 | Demuth | 139/79 |
| 4,436,199 | 3/1984 | Baba et al. | 198/621 X |

*Primary Examiner*—Jeffrey V. Nase
*Attorney, Agent, or Firm*—Wigman & Cohen

[57] ABSTRACT

The feed bars of a transfer press are reciprocated in the longitudinal and the transverse directions and a cam device synchronously links the longitudinal and transverse reciprocation. The cam device includes a conjugate cam which is built up from a plurality of layered cams.

5 Claims, 4 Drawing Figures

FEED BAR OPERATING DEVICE FOR A TRANSFER PRESS

BACKGROUND OF THE INVENTION

1. Field of the Invention

The present invention relates to a feed bar operating device for a transfer press, and in particular to an operating device which performs an advance and return operation on a feed bar.

2. Description of the Prior Art

When a transfer process is carried out in a press machine, the clamping and unclamping of the workpiece is generally carried out by means of the action of advancing and returning of a pair of feed bars which are provided with a plurality of fingers equally spaced in mutual opposition for holding the workpiece. In addition, an advance and return operation takes place by reciprocal motion in the longitudinal direction of the feed bars. This advance and return operation is usually performed by a combination of a planetary gear unit or link mechanism with a gear mechanism. In conventional devices, when the clamping and unclamping action occurs by the advance and return of the pair of feed bars, the movement of the feed bars in the longitudinal direction does not halt completely, but simply comes to a false stop. Accordingly, improving the feed precision becomes a problem, and, because this construction is complicated, manufacturing costs are high. Furthermore, a cam mechanism is used with the pair of feed bars to provide the clamping/unclamping and advance/return operations. However, in the conventional devices, generally a grooved cam or plate cam is used, so that there are many types of problems which arise. Specifically, when a grooved cam is used, a slight space is produced between the cam face and the cam follower, and in addition a slight space between the cam follower and cam follower shaft becomes a problem. When a plate cam is used, the cam follower is pressed against the cam face by a spring or the like, so that when the cam is rotating at a high speed, the cam follower separates from the cam face, making high speed operation a difficult problem.

SUMMARY OF THE INVENTION

An object of the present invention is to provide, with due consideration to the drawbacks of such conventional devices, an operating device which imparts a reliable and accurate reciprocating action to the feed bars even when the advance and return action of the pair of feed bars is carried out by means of a cam mechanism, so that during high speed operation the cam follower does not separate from the cam face.

In order to accomplish this object, the feed bars of the transfer press of the present invention are provided with an operating device for causing reciprocating action in their longitudinal direction and in the direction transverse to their longitudinal direction. On this operating device, a slider which is supported in a removable manner on the casing is connected to the feed bars so that it freely reciprocates in the longitudinal direction of the feed bars. Guide channel sections in the reciprocating direction of the slider and in the transverse direction are formed in the slider. The tip of a cam lever supported to freely swing on the casing is provided in a freely reciprocating manner in the reciprocating direction of the slider and contacts the guide channel section of the slider. The tip of a forked leg section formed on the base of the cam lever normally makes contact with the cam face of a cam device so as to clamp the cam face of the cam device which is positioned in a freely rotatable manner between the legs of the leg section.

BRIEF DESCRIPTION OF THE DRAWINGS

These and other objects, features and advantages of the present invention will become more apparent from the following description of a preferred embodiment taken in conjunction with the accompanying drawings, in which.

DESCRIPTION OF THE PREFERRED EMBODIMENT

Figure 1:
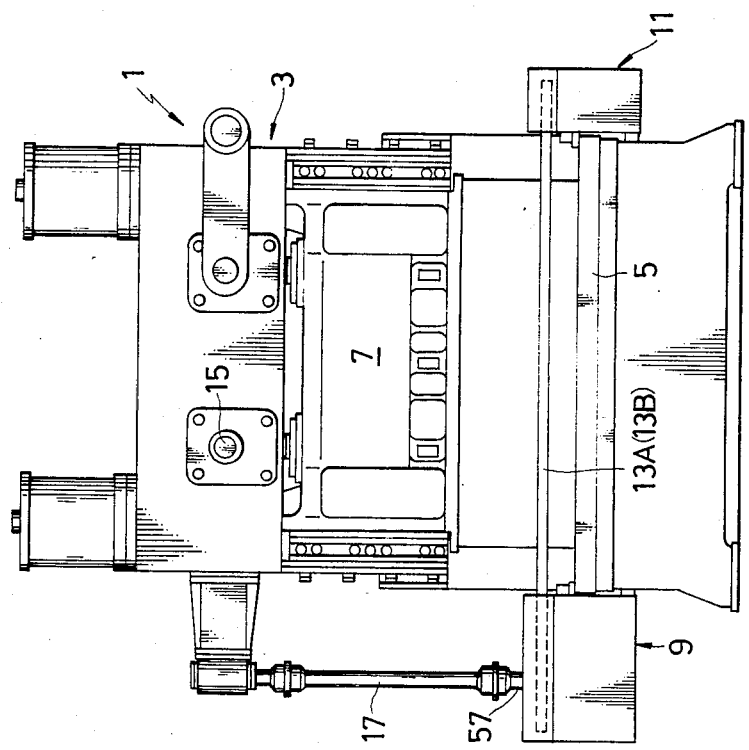
FIG. 1 is a front elevation of the transfer press.
Figure 2:
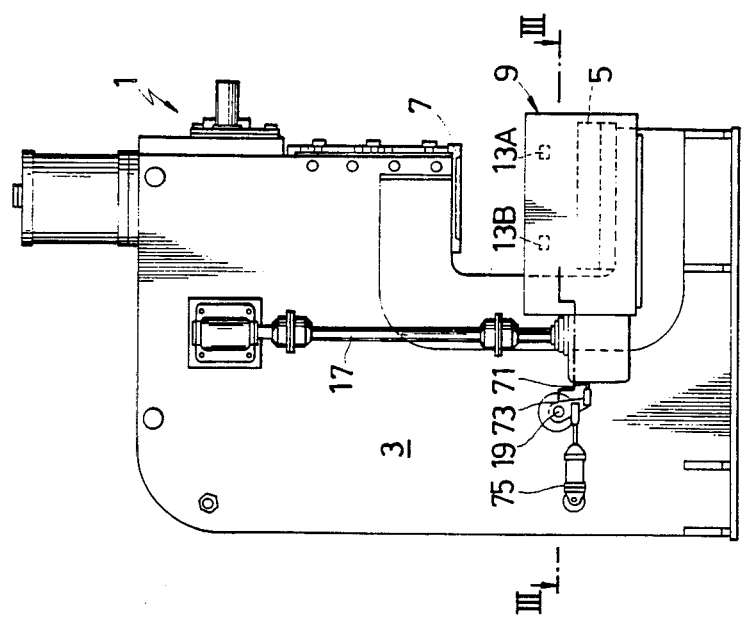
FIG. 2 is a left side elevation of the transfer press.

Now referring to FIG. 1 and FIG. 2, a transfer press 1 is provided with a frame 3, a bolster 5 having a lower die (omitted from the drawings) which is freely mounted thereon, and a ram 7 having an upper die (also omitted from the drawings) which is freely mounted thereon in a freely elevatable manner. A first operating device 9 is mounted on the left side of the bolster 5 and a second operating device 11 is mounted on the right hand side. The first operating device 9 extends in the left and right directions and supports the tips of a pair of feed bars 13A and 13B provided in parallel. The second operating device 11 supports the other end of the pair of feed bars 13A and 13B, and activates the feed bars 13A and 13B.

As a construction in which the pair of feed bars 13A and 13B are supported close to their tips for operation, the first operating device 9 and the second operating device 11 have almost the same construction, and, as will be described later, this construction allows the clamp/unclamp and advance/return operations to be carried out on the feed bars 13A and 13B. The first operating device 9, through a transmission shaft 17 which is interlockingly connected to an eccentric shaft 15 for elevating the ram 7, is interlockingly connected to the eccentric shaft 15 and operates synchronously with it. The first operating device 9 and the second operating device 11 operate synchronously, and extend in the left and right directions, interlockingly connected by a synchronous shaft 19 which is supported in a freely rotatable manner on the frame 3.

Figure 3:
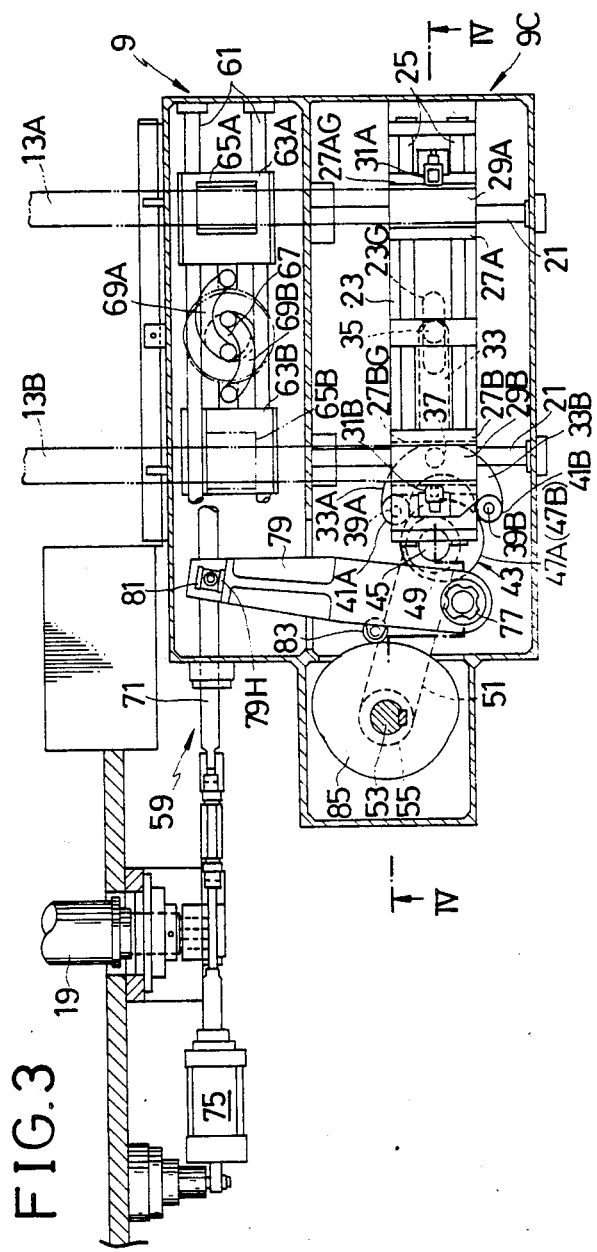
FIG. 3 is a partial sectional drawing viewing along the line III—III in FIG. 2.
Figure 4:
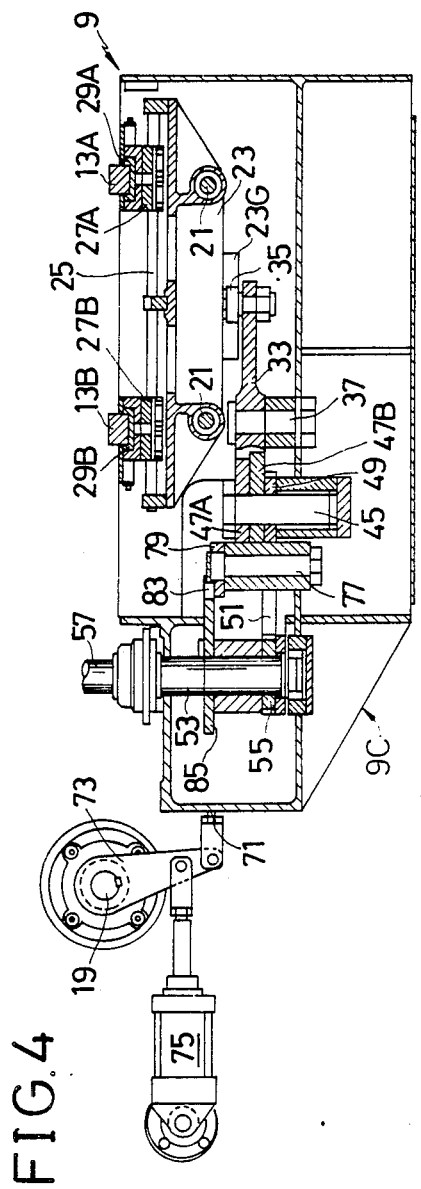
FIG. 4 is an expanded sectional drawing viewing along the line IV—IV in FIG. 3.

Now referring to FIG. 3 and FIG. 4, a slide guide 21 extending in the left and right directions (up and down in FIG. 3) is provided on a box-shaped casing 9C on the first operating device 9. A slider 23 is removably supported in a freely reciprocating manner on this slide guide 21. The slide guide 21 and a guide bar 25 in the transverse direction are removably supported on the slider 23. A plurality of holder blocks 29A and 29B contactingly support the ends of the feed bars 13A and 13B, and these holder blocks 29A and 29B are mounted on a pair of first slide blocks 27A and 27B which are supported in a freely reciprocating manner on the guide bar 25. The holder blocks 29A and 29B are in intimate contact with the interiors of a plurality of channels 27AG and 27BG which are formed in the left and right direction (up and down in FIG. 3) on the upper surface of the slide blocks 27A and 27B. The holder blocks 29A and 29B are maintained in the channels 27AG and 27BG by a plurality of pressure holders 31A and 31B which freely advance and return and are biased with a uniform pressure by means of a suitable pressure means such as a spring.

The pressure holders 31A and 31B act as safety devices by allowing movement of the holder blocks 29A and 29B relative to the slide blocks 27A and 27B when a large external force acts against the holder blocks 29A and 29B in the direction along the channel 27AG and 27BG.

From this construction it is readily evident that by the reciprocating movement of the slider 23 along the slide guide 21, the pair of feed bars 13A and 13B move in a reciprocating manner in the longitudinal direction to provide the advance and return action. In addition, by the reciprocating movement of the slide blocks 27A and 27B along the guide bar 25, the pair of feed bars 13A and 13B are mutually contacted and separated to provide the clamp/unclamp action.

Because the slider 23 moves reciprocatingly along the slide guide 21, the cam lever 33 is provided in a freely swinging manner below the slider 23. Specifically, a long guide channel section 23G is formed in the direction (the left and right direction in FIG. 3) transverse to the longitudinal direction of the slide guide 21 on the lower face of the slider 23, and a roller 35 provided on the tip of the cam lever 33, which is provided in a freely swinging manner in the casing 9C, contacts the guide channel section 23G. The tip of the cam lever 33, on which is provided the roller 35, is supported in a freely swinging manner on the casing 9C through the medium of a pivot 37 so that it moves reciprocatingly in the reciprocating direction of the slider 23. The base of the cam lever 33 is formed in a forked shape to provide a pair of leg sections 33A and 33B. A plurality of cam followers 41A and 41B are removably supported in a freely rotatable manner by a plurality of pins 39A and 39B on the respective tips of the legs 33A and 33B. A cam device 43 is positioned between both of the leg sections 33A and 33B of the cam lever 33 so that the cam lever 33 swings around the pivot 37. The cam device 43 comprises two plate cams 47A and 47B on a cam shaft 45 supported in a freely rotating manner on the casing 9C. The plate cams 47A and 47B are integrally layered. The cam follower 41A normally contacts the cam face of the plate cam 47A, while the other cam follower 41B normally contacts the cam face of the other plate cam 47B. Specifically, the structure for swinging the cam lever 33 comprises a conjugate cam in which the two cam followers 41A and 41B clamp the two plate cams 47A and 47B. In more detail, the construction is such that the sum of the dimension from the centerline of the cam shaft 45 to the centerline of the cam follower 41A, and the dimension from the centerline of the cam shaft 45 to the centerline of the other cam follower 41B, is always fixed. Specifically, when, for example, the cam follower 41A is pressed by the plate cam 47A the other plate cam 47B is pressed by the other cam follower 41B. Accordingly, through the configuration by which the space between the legs 33A and 33B of the cam lever 33 is made slightly smaller, the cam followers 41A and 41B are preloaded so that they can be held against the plate cams 47A and 47B by pressure. In addition, the space between the cam followers 41A and 41B and the pins 39A and 39B can become zero, and the cam followers 41A and 41B can be maintained so there is no separation whatsoever between these cam followers 41A and 41B and the plate cams 47A and 47B. Acoordingly, the feed bars 13A and 13B can operated at higher speeds, so that the advance and return action is carried out reliably and accurately.

Generally, a comparatively small pressure angle (about 30 deg) is set at the cam so that it will operate smoothly, making the diameter of the cam inevitably large. However, in the present invention, although detailed drawings have been omitted, the pressure angle set for the cam is large (about 45 deg) and the cam diameter is made small, so the inertia at high speeds is small.

As a result of this construction, when the cam shaft rotates, the plate cams 47A and 47B cause the cam lever 33 to swing. As a result of the swinging of the cam lever 33, the slider 23 moves in a reciprocating manner along the slide guide 21, and this reciprocating action of the slider 23 causes the advance and return action of the feed bars 13A and 13B. Even when the cam shaft 45, which causes high speed advance and return action of the feed bars, is rotating at a high speed, the inertia is small and the cam followers 41A and 41B do not separate from the plate cams 47A and 47B, so precise action results. In addition, although a detailed explanation will be omitted, the desired status of the velocity and acceleration of the advance and return action of the feed bars 13A and 13B, and the dwell during the clamping and unclamping action, can be set by the optional setting of the cam curve of the plate cams 47A and 47B.

A sprocket or pulley 49 is integrally mounted on the cam shaft 45 to rotate the cam shaft 45. A chain or belt 51 which runs around the pulley 49 also runs around a pulley 55 provided on a second cam shaft 53. The second cam shaft 53 is supported in a freely rotatable manner on the casing 9C, and is connected with the transmission shaft 17 through an intermediate shaft 57. Accordingly, the cam shaft 45 rotates synchronously with the eccentric shaft 15 of the transfer press 1 through the intermediate shaft 57 and the transmission shaft 17, so that the advance and return action of the feed bars 13A and 13B is related to the rotation of the eccentric shaft 15.

A clamp/unclamp mechanism 59 is provided on the first operating device 9 to cause the feed bars 13A and 13B to mutually contact and separate in a clamp and unclamp action when the feed bars 13A and 13B are halted. Specifically, a guide member 61, which extends in the front and back direction (left and right in FIG. 3) is provided on the casing 9C for the first operating device 9 adjoining the slider 23. A second pair of slide blocks 63A and 63B are supported on this guide member 61 so that they can mutually and freely contact and separate. A plurality of bar holders 65A and 65B supports the feed bars 13A and 13B in a freely sliding manner in the longitudinal direction only. These bar holders 65A and 65B are themselves supported on the slide blocks 63A and 63B. In order that the slide blocks 63A and 63B will have a mutually contacting and separating action, the other ends of a plurality of arc-shaped links 69A and 69B which are connected in a pivotally supported manner at one end to each of the slide blocks 63A and 63B, are also connected in a pivotally supported manner at the symmetric eccentric position of a rotating member 67 which is provided in a freely rotatable manner in substantially dead center. A pinion (omitted from the drawings) is integrally provided on this rotating member 67. A rack (omitted from the drawings), provided with a reciprocating rod 71, engages this pinion.

Because of this configuration, the reciprocating rod 71 moves with a reciprocating action, and, as a result of the reciprocating action of the rotating member 67, the feed bars 13A and 13B are caused to mutually approach and separate by the pair of slide blocks 63A and 63B.

Now referring once again to FIG. 2 and FIG. 3, the end of the reciprocating rod 71 is connected in a pivotally supported manner to the end of a rocking arm 73 mounted on the synchronous shaft 19. The piston rod of a cylinder device 75, which may be an air cylinder, is mounted on the frame 3 and is connected in a pivotally supported manner on the rocking arm 73. The cylinder device 75 is used to apply tension to the reciprocating rod 71 with a uniform force.

The base of a lever 79 is pivotally supported on a fixed shaft 77 which is positionally fixed on the casing 9C of the first operating device 9, in order to impart a reciprocating action to the reciprocating rod 71. A guide block 81 which is pivotally supported in a freely rotatable manner on the reciprocating rod 71 engages a slot 79H formed at the end of the lever 79. Accordingly, the reciprocating rod 71 can move reciprocatingly in the longitudinal direction as a result of the swinging of the lever 79.

A cam 85, corresponding to a cam follower 83 mounted close the center section of the lever 79, is mounted on the second cam shaft 53 in order to cause the lever 79 to swing. Accordingly, the cam follower 83 always makes contact with the cam 85 through the use of the cylinder device 75. The lever 79 is made to swing through the rotation of the second cam shaft 53, and the reciprocating rod 71 is caused to reciprocate in the longitudinal direction. As previously explained, the second cam shaft 53 rotates synchronously with the eccentric shaft 15, so it can be easily understood that the contact and separation (clamp/unclamp action) of the feed bars 13A and 13B is related to the rotation of the eccentric shaft 15.

As can be understood from this explanation of this embodiment of the present invention, compared to the conventional structure of the combination of a planetary gear unit or link mechanism with a gear mechanism, there are a small number of structural parts, and the overall construction can be made compact so that maintenance is simplified. In addition, there is no space between the cams and the cam followers and the cam is never separated from the cam follower. Because of the simplicity of construction compared with conventional devices, and from the advance and return action of the feed bars in the transfer press, high speed operation is possible, with reliable and accurate action.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A feed bar operating device for a transfer press comprising:
   operating means for causing a feed bar to reciprocatingly move in the longitudinal direction and in the direction transverse to the longitudinal direction, the operating means having a casing and a slider which is supported on the casing and connected to the feed bar so that said slider freely reciprocates in the longitudinal direction of the feed bar; a guide channel section formed in the slider transverse to the reciprocating direction of the slider and a cam lever supported to freely swing on the casing and having a tip provided in a freely reciprocating manner in the reciprocating direction of the slider and engaged with the guide channel section of the slider; said cam lever having at the end opposite said tip a forked leg section; and a conjugate cam device having a cam face comprising a plurality of cam plates; and wherein the forked leg section of the cam lever is formed of a single piece of material supporting a pair of legs which are spaced sufficiently far apart so that the cam lever normally makes contact with the cam face of the cam device so as to clamp the cam face of the cam device in a freely rotatable manner between the legs of the leg section, and wherein each of said legs contacts a separate cam plate of said conjugate cam device.

2. The feed bar operating device of claim 1, wherein: the cam device consists of two layered cams.

3. A feed bar operating device for a transfer press having an eccentric shaft and means for imparting a reciprocating motion to a pair of feed bars in the transfer press in the mutually approaching and separating direction and in the longitudinal direction of the feed bars comprising:
   first action means to cause the pair of feed bars to mutually approach and separate;
   second action means for imparting a reciprocating motion in the longitudinal direction of the feed bars;
   first cam means for synchronously linking the first action means to the rotation of the eccentric shaft, and second cam means for synchronously linking the second action means to the rotation of the eccentric shaft, said first cam means having a plate cam mechanism, said second cam means comprising a conjugate cam built up from a plurality of plate cams, said second action means comprising a forked, freely swinging cam lever which clamps the conjugate second cam means; and
   slider means connected with said cam lever for supporting the pair of feed bars and for reciprocation by the swinging action of the cam lever in the longitudinal direction of the feed bars, said forked cam lever being formed from a single piece of material supporting a pair of legs which are spaced sufficiently far apart so as to clamp the periphery of the conjugate second cam means between said legs and wherein each of said legs contacts a separate plate cam of said conjugate cam.

4. The feed bar operating device of claim 3, wherein:
   the first action means comprises a lever which is imparted a reciprocating motion by means of said plate cam mechanism;
   a rotating member is connected with said lever which is imparted a reciprocating motion by means of the swinging movement of said lever;
   a pair of slide blocks are provided in the operating device which support the feed bars in a freely slidable manner in the longitudinal direction; and
   a pair of arc-shaped links are connected between the eccentric position of the rotating member and the pair of slide blocks so that the pair of slide blocks approach and retreat from each other.

5. The feed bar operating device of claim 3, wherein:

a slide block supporting said feed bars is mounted in a freely sliding manner on said slider, and a pressure holder, having biasing means for retaining said feed bars is mounted on said slide block, whereby said pressure holder performs the action of a safety device by allowing movement in the longitudinal direction of the feed bars.

* * * * *